US006187441B1

(12) United States Patent
Takeuchi et al.

(10) Patent No.: US 6,187,441 B1
(45) Date of Patent: Feb. 13, 2001

(54) GLASS SUBSTRATE FOR INFORMATION RECORDING MEDIUM AND MAGNETIC RECORDING MEDIUM HAVING THE SUBSTRATE

(75) Inventors: Kunio Takeuchi, Hachioji; Teruki Kitayama, Ome, both of (JP)

(73) Assignee: Hoya Corporation, Tokyo (JP)

( * ) Notice: Under 35 U.S.C. 154(b), the term of this patent shall be extended for 0 days.

(21) Appl. No.: 08/997,890

(22) Filed: Dec. 24, 1997

(30) Foreign Application Priority Data

Dec. 26, 1996 (JP) ................................................ 8-357054
Dec. 26, 1996 (JP) ................................................ 8-357056
Dec. 26, 1996 (JP) ................................................ 8-357057

(51) Int. Cl.[7] ........................................................ G11B 5/66
(52) U.S. Cl. .................. 428/410; 428/428; 428/694 ST; 428/694 SG; 428/900
(58) Field of Search ....................................... 428/410, 428, 428/694 ST, 694 SG, 900

(56) References Cited

U.S. PATENT DOCUMENTS 4,156,755 * 5/1979 Rinehart ................................ 428/410

FOREIGN PATENT DOCUMENTS

| 62-187140 | 8/1987 | (JP) . |
| 64-42025 | 2/1989 | (JP) . |
| 1239036 | 9/1989 | (JP) . |
| 5-32431 | 2/1993 | (JP) . |
| 8-48537 | 2/1996 | (JP) . |

* cited by examiner

*Primary Examiner*—Leszek Kiliman
(74) *Attorney, Agent, or Firm*—Sughrue, Mion, Zinn, Macpeak & Seas, PLLC

(57) ABSTRACT

A glass substrate contains at least $ZrO_2$ and $Li_2O$. In this event, $ZrO_2$ has a content which falls within the range between 0.6 and 1.9 mol % while $Li_2O$ has a content which falls within the range between 6 and 14 mol %. Thus, the contents of $ZrO_2$ and $Li_2O$ are restricted to a predetermined range. Consequently, the projections of the undissolved substance of $ZrO_2$ are not formed on the surface of the glass substrate. As a result, the glass substrate having the flat surface can be obtained.

12 Claims, No Drawings

GLASS SUBSTRATE FOR INFORMATION RECORDING MEDIUM AND MAGNETIC RECORDING MEDIUM HAVING THE SUBSTRATE

BACKGROUND OF THE INVENTION

This invention relates to a glass substrate for an information recording medium, and an information recording medium such as a magnetic recording medium having the glass substrate.

Conventionally, a glass substrate having a high strength for a magnetic recording medium is disclosed in Unexamined Japanese Patent Publication No. S64-42025. This glass contains, by weight, 65–75% of $SiO_2$, 4–9% of $Al_2O_3$, 5–10% of $B_2O_3$, 5–9.5% of $Na_2O$, 0–3% of $K_2O$, 0–0.5% of $Li_2O$, 3–6% of $BaO$ and 0.5–3% of $ZnO$.

Further, a glass substrate having a chemically reinforced glass for an information recording medium is disclosed in Japanese Unexamined Patent Publication No. H5-32431. This glass contains, by weight, 62–75% of $SiO_2$, 5–15% of $Al_2O_3$, 4–10% of $Li_2O$, 4–12% of $Na_2O$, 5.5–15% of $ZrO_2$. In this event, the weight ratio $Na_2O/ZrO_2$ falls within the range between 0.5 and 2.0. Further, the weight ratio of $Al_2O_3/ZrO_3$ falls within the range between 0.4 and 2.5.

In addition, a chemically reinforced glass which contains, by weight, 58–70% of $SiO_2$, 13–22% of $Al_2O_3$, 5–12% of $Na_2O$ and 2–5% of $ZrO_2$ is disclosed in Japanese Unexamined Patent Publication No. H8-48537.

Recently, a flying height of a head has been lowered, and a rotating speed of a disk has become high with a miniaturization of the disk and a high recording density. Therefore, the strength and surface accuracy of the disk has been strictly required.

Under the circumstances, the above-mentioned conventional techniques have the following problems.

First, the glass substrate disclosed in the above-referenced Japanese Unexamined Patent Publication No. S64-42025 contains no $ZrO_2$. Therefore, the ion exchange rate becomes slow when an ion exchange process is performed. Further, it is difficult to obtain an ion exchange layer (a compressive stress layer) having enough depth. In addition, the strength for destruction is also small.

Second, the glass substrate disclosed in the above-referenced Japanese Unexamined Patent Publication No. H5-32431 is excellent in the ion exchange performance, but contains much $ZrO_2$. Consequently, it is difficult to dissolve $ZrO_2$ and, further, it is impossible to remove projections of undissolved substances of $ZrO_2$ on the glass surface even when the obtained glass is polished. As a result, the projections are often left on the surface of the glass substrate.

The obtained glass substrate may be practically applicable as a recent glass substrate for the information recording medium. However, the glass substrate may not be able to meet the demand for much higher density of the information recording medium in future. Specifically, the flying height of the magnetic head has been reduced with the increase in recording density. Consequently, the conventional glass substrate is not compatible with the magnetic head having the low flying height such as a magneto-resistive head (MR head) because the conventional glass substrate has projections on the glass surface.

Further, the conventional glass substrate contains much $ZrO_2$ as mentioned before. Consequently, it is difficult to sufficiently increase a specific modulus because the glass has a large specific gravity. In this event, when the specific modulus becomes enough large, the burring does not easily occur even when the disk rotates at a high speed.

Finally, the glass substrate disclosed in the above-referenced Japanese Unexamined Patent Publication No. H8-48537 has a high liquid phase temperature and a low viscosity at the liquid phase temperature. Consequently, the devitrification is easily performed when a dissolved glass is formed into a plate form by the use of the downdraw molding or the press molding.

SUMMARY OF THE INVENTION

It is therefore an object of this invention to provide a chemically reinforced glass substrate for an information recording medium which has an excellent ion exchange performance and which is capable of providing a deep compressive stress layer for the chemically reinforced glass.

It is another object of this invention to provide a glass substrate which is excellent in strength.

It is a still another object of this invention to provide a glass substrate which has a flat surface.

It is a yet another object of this invention to provide a glass substrate which has a high glass viscosity without devitrification during the formation of the glass substrate.

It is a further object of this invention to provide a glass substrate which has a high specific modulus so that no burring occurs during a high speed rotation of a disk.

According to this invention, the glass substrate contains at least $ZrO_2$ and $Li_2O$. In this event, $ZrO_2$ has a content which falls within the range between 0.6 and 1.9 mol % while $Li_2O$ has a content which falls within the range between 6 and 14 mol %. In this invention, the contents of $ZrO_2$ and $Li_2O$ are restricted to a predetermined range. Consequently, the projections of the undissolved substance of $ZrO_2$ are not formed on the surface of the glass substrate. As a result, the glass substrate having the flat surface can be obtained. Further, the chemically reinforced glass which is obtained by the ion exchange method has the deep compressive stress layer and the high strength. Further, the viscosity in the liquid phase temperature can be lowered because the ion exchange performance is sufficiently ensured.

Further, according to this invention, the glass substrate contains at least $ZrO_2$, $TiO_2$ and $B_2O_3$. In this event, $ZrO_2$ has a content which is 2.8 mol % or less while $TiO_2$ has a content which falls within the range between 0.2 and 3.0 mol %. Further, $B_2O_3$ has a content which is 0.9 mol % or less. In this invention, Young's modulus becomes large without an excessive large specific gravity by containing $TiO_2$ at a predetermined content. Consequently, the specific modulus can become large.

Moreover, according to this invention, the glass substrate contains $ZrO_2$. The glass substrate has projections on the substrate surface. In this case, the height of the projection is 7 μm or less. In this invention, the height of the projection on glass surface is restricted to the predetermined range. Consequently, the glass substrate can comply with the low flying height of the magnetic head.

DESCRIPTION OF THE PREFERRED EMBODIMENTS

Description will be made about a glass substrate for an information recording medium according to embodiments of this invention.

First embodiment

The glass substrate contains $ZrO_2$. In this event, the content of $ZrO_2$ falls within the range between 0.6 and 1.9 mol %. If the content of $ZrO_2$ exceeds 1.9 mol %, it is difficult to completely dissolve $ZrO_2$, and projections of the undissolved substance of $ZrO_2$ are often left on the glass surface even when the obtained glass is polished. Consequently, it is difficult to obtain enough flatness as the glass substrate for the information recording medium. Therefore, the content of $ZrO_2$ is restricted to 1.9 mol % or less. From the same reason, the upper limit of the preferable content of $ZrO_2$ is 1.7 mol %, and more preferably 1.5 mol %. On the other hand, $ZrO_2$ serves to improve an ion exchange performance. Consequently, the compressive stress layer becomes thick, a transverse bending strength is improved and Knoop hardness becomes large. Therefore, it is necessary that the content of $ZrO_2$ is 0.6 mol % or more. From the same reason, the lower limit of the content of $ZrO_2$ is 0.8 mol %, and more preferably 1.0 mol %.

Further, the glass substrate contains $Li_2O$. In this event, the content of $Li_2O$ falls within the range between 6 and 14 mol %. $Li_2O$ is an essential component for chemically reinforcing the glass by ion-exchanging with Na ions in an ion exchanging solution. When the content of $Li_2O$ is less than 6 mol %, the ion exchange performance is lowered. Therefore, it is necessary that the lower limit of the content of $Li_2O$ is 6 mol %, preferably 8 mol %, and more preferably 9 mol %. On the other hand, the content of $Li_2O$ exceeds 14 mol %, the liquid temperature becomes high, the viscosity at the liquid phase temperature becomes low and the devitrification is easily performed during the formation of the glass substrate. Therefore, it is necessary that the upper limit of the content of $Li_2O$ is 14 mol %, preferably 13 mol %, and more preferably 12 mol %. Moreover, the glass substrate contains $Li_2O$ so that the viscosity at the liquid phase temperature of the glass exceeds 20000 poises.

In the first embodiment, the glass substrate may contain $TiO_2$. $TiO_2$ serves to reduce the melting viscosity and the melting temperature and to improve the ion exchange rate to easily perform the ion exchange. Further, $TiO_2$ serves to enlarge Young's modulus and the specific modulus without enlarging specific gravity. Therefore, the content of $TiO_2$ is preferably 0.2 mol % or more, and more preferably 0.4 mol % or more. However, when the content of $TiO_2$ exceeds 3 mol %, the devitrification is easily performed. Therefore, it is necessary that the upper limit of $TiO_2$ is 3 mol %, and more preferably 2.7 mol %.

Second embodiment

The glass substrate contains $TiO_2$. In this event, the content of $TiO_2$ falls within the range between 0.2 and 3.0 mol %. $TiO_2$ serves to enlarge Young's modulus without enlarging specific gravity. Consequently, the specific modulus can become large. Further, $TiO_2$ serves to reduce the melting viscosity and the melting temperature and to improve the ion exchange rate to easily perform the ion exchange. To achieve these effects, it is necessary that the content of $TiO_2$ is 0.2 mol % or more. In this case, the lower limit is preferably 0.3 mol %, and more preferably 0.4 mol %. However, when the content of $TiO_2$ exceeds 3 mol %, the devitrification is easily performed. Therefore, it is necessary that the upper limit of the content of $TiO_2$ is 3 mol %, and preferably 2.8 mol %, and more preferably 2.6 mol %.

Further, the glass substrate contains $ZrO_2$. In this event, the content of $ZrO_2$ is 2.8 mol % or less. The content of $ZrO_2$ exceeds 2.8 mol %, the specific gravity becomes large. Consequently, the specific modulus becomes low. Further, it is difficult to completely dissolve $ZrO_2$. Therefore, the projections of the undissolved substance of $ZrO_2$ are often left on the glass surface even when the obtained glass is polished. Consequently, it is difficult to obtain enough flatness as the glass substrate for the information recording medium. As a result, the content of $ZrO_2$ is restricted to 2.8 mol % or less. From the same reason, the upper limit of the preferable content of $ZrO_2$ is 2.6 mol %, and more preferably 2.4 mol %.

Moreover, the glass substrate contains $B_2O_3$. In this case, the content of $B_2O_3$ is 0.9 mol % or less. $B_2O_3$ serves to reduce the viscosity and to improve the meltability. However, $B_2O_3$ prevents the ion exchange and the deep compressive stress layer. Therefore, it is desirable the glass substrate does not contain much $B_2O_3$. Consequently, the content of $B_2O_3$ is restricted to 0.9 mol % or less, as mentioned above. In this case, the lower limit of the content of $B_2O_3$ is preferably 0.7 mol %, and more preferably 0.5 mol %. Further, the content of $B_2O_3$ may be restrained so that the compressive stress layer having the thickness exceeding 100 μm is formed for the glass substrate when the glass is immersed in a chemical reinforcing process solution of a mixed salt containing 60 weight % of $KNO_3$ and 40 weight % of $NaNO_3$ which are kept at 400° C.

In addition, the glass substrate contains $Li_2O$. $Li_2O$ serves to chemically reinforce the glass by ion-exchanging with Na ions in an ion exchanging solution. In this event, the content of $Li_2O$ preferably falls within the range between 6 and 16 mol %. When the content of $Li_2O$ is less than 6 mol %, the ion exchange performance is lowered. On the other hand, the content of $Li_2O$ exceeds 16 mol %, the devitrification is easily performed to deteriorate the chemical durability, and further, the liquid phase temperature becomes high. From the same reason, the content of $Li_2O$ preferably falls within the range between 8 and 15 mol %, and more preferably 9 and 14 mol %.

Third embodiment

In this embodiment, the height of the projection on the glass surface is restricted to 7 μm or less. When the height exceeds 7 μm, the spacing loss between the magnetic head and the magnetic recording medium becomes large to reduce the magnetic recording density. From the same reason, the height of the projection is preferably 5 μm or less, and more preferably 3 μm or less.

The surface roughness (Ra) is preferably 10.0 angstroms or less, particularly, 8.0 angstroms or less, and more preferably 6.0 angstroms or less.

Further, the glass substrate contains $ZrO_2$. $ZrO_2$ relates to the height of the projection. In this embodiment, the content of $ZrO_2$ falls within the range between 0 and 2.8 mol %. When the content of $ZrO_2$ exceeds 2.8 mol %, the projections of the undissolved substance due to $ZrO_2$ are formed on the glass surface. In this event, it is difficult to remove the projections even when the glass substrate is polished. Therefore, the height of the projection on the glass surface should be restrained to the proper value. In this case, it is desirable that the content of $ZrO_2$ is 2.8 mol % or less. From the same reason, the content of $ZrO_2$ is preferably 2.4 mol % or less, and more preferably 1.9 mol % or less.

Moreover, the glass substrate contains $Li_2O$. $Li_2O$ serves to chemically reinforce the glass by ion-exchanging with Na ions in an ion exchanging solution. In this event, the content of $Li_2O$ preferably falls within the range between 6 and 16 mol %. When the content of $Li_2O$ is less than 6 mol %, the ion exchange performance is lowered. On the other hand, the content of $Li_2O$ exceeds 16 mol %, the devitrification is easily performed to deteriorate the chemical durability. Further, the liquid phase temperature becomes high. From the same reason, the content of $Li_2O$ preferably falls within the range between 8 and 15 mol %, and more preferably 9 and 14 mol %.

In addition, the glass substrate may contain $TiO_2$. $TiO_2$ serves to reduce the melting viscosity and the melting temperature. It is necessary that the upper limit of the content of $TiO_2$ is 3 mol %. This is because the devitrification is easily performed when the content of $TiO_2$ exceeds 3 mol %.

In the first, the second, and the third embodiments, the glass substrate may contain $SiO_2$, $Al_2O_3$, and $Na_2O$.

$SiO_2$ is a main component for forming a glass framework. The content of $SiO_2$ preferably falls within the range between 57 and 74 mol %. When the content of $SiO_2$ is less than 57 mol %, the chemical durability is deteriorated. On the other hand, when the content exceeds 74 mol %, the melting temperature becomes excessively high. From the same reason, the content of $SiO_2$ preferably falls within the range between 60 and 72 mol %, and more preferably between 63 and 70 mol %.

In this case, the mol ratio of $SiO_2/ZrO_2$ preferably falls within the range between 35 and 130. When the mol ratio is less than 35, the glass become unstable. Further, it is difficult to obtain enough flatness as the glass substrate for the information recording medium even when the obtained glass is polished. On the other hand, when the mol ratio exceeds 130, the Knoop hardness and the strength become low. From the same reason, the mol ratio of $SiO_2/ZrO_2$ preferably falls within the range between 40 and 115, and more preferably between 50 and 105.

$Al_2O_3$ serves to improve the ion exchange performance on the glass surface. The content of $Al_2O_3$ preferably falls within the range between 3 and 15 mol %. When the content is less than 3 mol %, the ion exchange performance is lowered and the chemical durability is deteriorated. On the other hand, the content exceeds 15 mol %, the devitrification is degraded. From the same reason, the content of $Al_2O_3$ preferably falls within the range between 5 and 14 mol %, more preferably between 7 and 13 mol %.

$Na_2O$ serves to reduce the melting temperature and to chemically reinforce the glass by ion-exchanging with Na ions in the ion exchanging solution. The content of $Na_2O$ preferably falls within the range between 4 and 14 mol %. When the component is less than 4 mol %, the ion exchange rate becomes low, it is difficult to obtain the deep compressive stress layer and the devitrification is deteriorated. On the other hand, if the content exceeds 14 mol %, the chemical durability is deteriorated and the Knoop hardness becomes small. From the same reason, the content of $Na_2O$ preferably falls within the range between 5 and 13 mol %, and more preferably between 6 and 12 mol %.

The above glass for the chemical reinforcement may contain MgO, CaO, SrO, BaO, ZnO, $La_2O_3$, $As_2O_3$, $Sb_2O_3$, CoO, $Fe_2O_3$, $Cr_2O_3$, $B_2O_3$, NiO, Se, F and Cl other than the above-mentioned components in such a range that the glass characteristic is not damaged.

In this event, $B_2O_3$ serves to reduce the viscosity and to improve the melting characteristic. However, $B_2O_3$ prevents the ion exchange performance and the formation of the deep compressive stress layer. Therefore, the content is preferably 0.9 mol % or less, and more preferably 0.5 mol % or less.

A method of manufacturing the glass substrate for the information recording medium is not particularly restricted. For example, a glass material is prepared so that the glass composition falls within the above-mentioned range. Thereafter, the glass material is heated and dissolved at 500° C. for 5 to 8 hours. After the dissolved glass is cleaned, the glass is formed into a plate form by the method such as the known press molding, downdraw molding and float molding. Thereafter, the glass is ground and polished to fabricate the glass substrate for the information recording medium having the desired structure.

In general, the grinding and polishing process is divided into (1) a rough grinding step, (2) a lapping step, (3) a first polishing step, and (4) a second polishing step. The glass substrate which has the projection of the height of 7 $\mu$m or less on the glass surface and which is excellent in the flatness can be obtained by the synergistic effect of the precise polishing step and the above-mentioned glass composition.

When the height of the projection on the surface of the glass substrate exceeds 7 $\mu$m, the spacing loss between the magnetic head and the magnetic recording medium becomes large to reduce the recording density. For the same reason, the height of the projection on the glass surface is preferably 5 $\mu$m or less, and more preferably 3 $\mu$m or less.

The glass substrate according to this invention has the liquid phase temperature (L.T.) of 920° C. or less and the viscosity at the liquid phase temperature of 20000 poises or more. Consequently, the glass substrate can be formed by the use of the forming method such as the downdraw molding and the press molding without the devitrification of the glass. According to this invention, it is possible that the viscosity at the liquid phase temperature is set to 22000 poises or more and the liquid phase temperature is set to 900° C. or less.

The glass substrate has Young's modulus of 80 GPa or more, specific modulus of $32 \times 10^6$ Nm/Kg or more and Knoop hardness of 5.5 GPa or more. It is difficult to cause warping or burring for the substrate even when the substrate is rotated at a high speed because the glass substrate has a high strength. Consequently, the substrate can be thinly formed.

The glass substrate has a glass transition point between 470 and 530° C. This characteristic is advantageous in the following point. Namely, when a magnetic film is formed on the glass substrate, a thermal treatment is often performed to improve the characteristic such as the coercive force. In this event, when the glass transition point is less than 470° C., the glass substrate can not withstand the thermal treatment and further, the glass is easily deformed when the glass substrate is immersed in the ion exchange solution. Conversely, when the glass transition point exceeds 530° C., the ion exchange requires a long time. These conditions are not practical.

The glass substrate has a pH value between 6.5 and 7.5. Further, the glass substrate has a weight loss rate of 0.1 wt % or less when the glass substrate is immersed in pure water of 100° C. for 60 minutes while the glass substrate has the weight loss rate of 0.1 wt % or less when the glass substrate is immersed in nitric acid solution of 100° C. for 60 minutes at the concentration of 0.01N. Therefore, the glass substrate is advantageous in the chemical durability such as water resisting property and acid resistance.

The glass substrate has an excellent ion exchange performance. Further, the glass substrate can provide a deep compressive stress layer for the chemically reinforced glass which is obtained by the ion exchange method, and can provide a high transverse bending strength due to the compressive stress layer and a high Knoop hardness. Therefore, the glass substrate having the above-mentioned composition has an excellent resistance to destruction.

Specifically, the compressive stress layer having the thickness exceeding 100$\mu$m can be obtained when the glass substrate is immersed in a process solution of a mixed salt containing $KNO_3$ of 60 weight % and $NaNO_3$ of 40 weight % which are kept at 400° C. for 4 hours.

For example, the chemical reinforcement is carried out by ion-exchanging the chemically reinforced glass in a process solution containing Na ions and/or K ions.

In this event, the process solution containing sodium nitrate and/or potassium nitrate is preferably used as the process solution containing Na ions and/or K ions. However, the solution is not restricted to nitrate, and sulfate, bisulfate, binitrate, carbonate, bicarbonate and halogenide may be used.

When the process solution contains Na ions, Na ions are exchanged with Li ions in the glass. Further, when the process solution contains K ions, K ions are exchanged with Na ions in the glass. Moreover, when the process solution contains Na ions and K ions, Na ions and K ions are exchanged with Li ions and Na ions in the glass.

Alkali metal ions in the surface portion of the glass are replaced to alkali metal ions having larger ion radius by the above ion exchange. Consequently, the compressive stress layer is formed on the glass surface to reinforce the glass.

In this invention, irregularities may be formed on the principal surface of the glass substrate by the etching process, the depositing process, the laser light irradiation process or the ultraviolet light irradiation process to perform the texturing process.

Specifically, the irregularities are formed on the glass surface to perform the texturing process by wet-etching the surface of the glass substrate in an etching liquid consisting of a mixed liquid of hydrofluoric acid and nitrate. Alternatively, the texturing process can be performed for the glass surface by forming an irregularity film such as aluminum on the surface of the glass substrate.

Subsequently, description will be made about a magnetic recording medium of this invention.

The magnetic recording medium is structured by forming at least a magnetic film on the principle surface of the above glass substrate. In this case, the principle surface means a surface on which the magnetic layer is formed among the both surfaces of the glass substrate, and means one side or both sides.

An underlying layer, a protection layer, a lubricant layer and an irregularity layer are formed other than the magnetic film as needed. These layers are formed by the use of the known various thin-film forming methods.

For example, a non-magnetic metal material or materials of at least one selected from the group consisting of Cr, Mo, Ta, Ti, W, V, B and Al or oxide, nitride or carbide of these metals are used as the underlaying layer. The underlying layer is not limited to a single layer, and a multi-layer structure in which the same or different kinds of layers are deposited may be used. For example, the underlying layer of the multi-layer such as Al/Cr/CrMo and Al/Cr/Cr may be used.

The underlying layer of the magnetic recording medium is selected in accordance with the magnetic layer. For example, a single substance of Cr or a Cr alloy is preferable as the underlying layer in the case of the magnetic layer containing Co as a main component.

In this invention, an irregularity control layer for preventing the adsorption between the magnetic head and the magnetic recording medium may be formed between the glass substrate and the magnetic layer or on the magnetic layer. The surface roughness of the magnetic recording medium is properly adjusted by forming the irregularity control layer. Consequently, the magnetic head does not adsorb with the magnetic recording medium to obtain the magnetic recording medium having a high reliability.

Many kinds of materials and forming methods have been known about the irregularity control layer. A non-magnetic metal material which has the melting point higher than that of the above glass substrate may preferably be used as the irregularity control layer although not restricted in particular. For example, at least one metal selected from the group consisting of Al, Ag, Ti, Nb, Ta, Bi, Si, Zr, Cr, Cu, Au, Sn, Pd, Sb, Ge, and Mg, alloy or oxide thereof, and nitride and carbide thereof may be used as the material of the irregularity control layer. It is desirable that a metal containing Al as a main component such as a single substance of Al, aluminum oxide and aluminum nitride is used as the material of the irregularity control layer from the viewpoint of easy formation.

Further, it is desirable that the surface roughness Rmax of the irregularity control layer falls within the range between 50 and 300 angstrom, taking a head stiction into consideration. More preferably, the surface roughness Rmax falls within the range between 100 and 200 angstroms. When Rmax is less than 50 angstroms, the magnetic head adsorbs with the magnetic recording medium because the magnetic recording medium is substantially flat. Consequently, the magnetic head and the magnetic recording medium are damaged, and a head crash is caused by the adsorption. On the other hand, Rmax exceeds 300 angstroms, a glide height becomes high to reduce the recording density.

The material of the magnetic layer is not particularly restricted. For example, a ferrite-based material, an iron-rare earth based material other than a Co-based material are exemplified as the magnetic layer. Both a horizontal magnetic recording method and a vertical magnetic recording method are used as the recording method of the magnetic layer.

Magnetic thin-films such as CoPt, CoCr, CoNi, CoNiCr, CoCrTa, CoPtCr, CoNiCrPt, CoNiCrTa, CoCrPtTa, CoCrPt-SiO are exemplified as the Co-based magnetic layer. Alternatively, a multi-layer structure (for example, CoPtCr/CrMo/CoPtCr) which is formed by separating the magnetic layer by a non-magnetic intermediate layer may be used to reduce a noise.

During the fabrication of the magnetic recording medium, the magnetic layer can be heated at a lower temperature than the glass transition point after the magnetic layer is formed on the principal surface of the glass substrate. This is because the magnetic characteristic can be improved by the heat treatment in accordance with the kind of the magnetic layer. The heat treatment may be performed in any step during or after the formation of the magnetic layer at such a temperature that does not affect the characteristic of the protection layer or the lubricant layer. The heating process temperature for improving the magnetic characteristic is different in accordance with the magnetic layers and are selected as needed.

A Cr film, a Cr alloy film, a carbon film, a zirconia film, a silica film are exemplified as the protection layer. These protection films can be successively deposited by the use of the known in-line sputtering apparatus with the underlying layer and the magnetic layer. The protection layer may be a single layer or a multi-layer consisting of the same or different films.

The other protection layer may be formed on the above protection layer or instead of the above protection layer. A silicon oxide ($SiO_2$) film may be formed on the protection layer by dispersing colloidal silica fine grains in tetraalkoxysilane diluted with an alcohol-based solvent and thereafter by coating and baking the dispersed grains. In this event, the $SiO_2$ film functions as both the protection layer and the irregularity control layer (due to colloidal silica fine grains).

Many kinds of suggestions have been made about the lubricant layer. The lubricant layer is generally formed by diluting perfluoropolyether (PFPE) (liquid lubricant material) with a solvent, such as freon-based solvent, and applying it on the medium surface by a dipping method, a spin coating method, or a spraying method, and heating the medium as needed.

In the information recording medium according to this invention, the glass substrate which is composed of the aluminosilicate glass and which has the Young's modulus of 80 GPa or more, the specific modulus of $32 \times 10^6$ Nm/Kg or more, the Knoop hardness of 5.5 GPa or more and the projection height of 7 μm or less is chemically reinforced, and thereafter, a thin-film containing at least a recording layer is formed on the glass substrate.

In this case, the Young's modulus, the Knoop hardness and the surface roughness of the aluminosilicate glass can be selected to a predetermined level or more by adjusting the glass composition. Specifically, the Young's modulus of 80 GPa or more, the specific modulus of $32 \times 10^6$ Nm/Kg or more, the Knoop hardness of 5.5 GPa or more and the projection height of 7 μm or less can be obtained in the above glass substrate for the information recording medium.

The glass substrate according to this invention is excellent in various strengths (mechanical characteristic), the resist destructivity, the flatness and the chemical durability. Therefore, the glass substrate is preferably applicable for the glass substrate for the information recording medium, such as a glass substrate for a magnetic recording medium, a glass substrate for a photo-magnetic recording medium, a glass substrate for a photo-recording medium, or a glass substrate for an electro-optical application, a glass substrate for a low temperature polysilicon liquid crystal display device which has been expected as a LCD of the next generation, and a glass substrate for an electrical part.

Detail description will be made about examples according to the foregoing embodiments of this invention.

Fabrication of the glass substrate:

EXAMPLES 1 to 25

The glass substrates for information recording medium having the composition represented by Tables 1 to 6 were fabricated. An oxide, a nitride, a carbonate, a nitrate, a hydroxide were used as the material in each example. Each material was weighed in each example so that the composition after dissolving and gradually cooling represents the glass composition represented by Tables 1 to 6. Thereafter, the obtained mixed material was heated at a temperature between 1400 and 1500° C. for 5–8 hours to obtain a glass solution. After the glass solution is aggregated, degassed, homogenized and cleaned, the glass substrate is formed into a plate form by the use of the downdraw molding or the press molding. At this time, no devitrification was observed.

Subsequently, the obtained glass of the plate form was cleaned with water. Thereafter, (1) a rough grinding step, (2) a lapping step, (3) a first polishing step, and (4) a second polishing step which will be described later were carried out.

(1) Rough grinding step

The obtained glass substrate was cut into a disc shape by a grindstone, and was ground by a relatively rough diamond grindstone to form a disc-shaped glass substrate to a diameter of 67 mm and a thickness of 1.5 mm.

TABLE 1

| | Example | | | | |
|---|---|---|---|---|---|
| | 1 | 2 | 3 | 4 | 5 |
| Composition | | | | | |
| $SiO_2$ (mol %) | 66.8 | 67.0 | 67.5 | 67.4 | 68.0 |
| $ZrO_2$ (mol %) | 0.6 | 1.0 | 1.5 | 1.0 | 1.5 |
| $Al_2O_3$ (mol %) | 8.5 | 9.0 | 9.5 | 9.5 | 10.0 |
| $Li_2O$ (mol %) | 12.1 | 12.0 | 10.0 | 12.1 | 10.0 |
| $Na_2O$ (mol %) | 10.0 | 10.0 | 10.5 | 9.0 | 9.5 |
| $TiO_2$ (mol %) | 1.0 | 1.0 | 0.5 | 1.0 | 0.5 |
| CaO (mol %) | 1.0 | — | — | — | 0.5 |
| MgO (mol %) | — | — | 0.5 | — | — |
| $As_2O_3$ (mol %) | 0.1 | 0.1 | 0.1 | 0.1 | 0.1 |
| $Sb_2O_3$ (mol %) | 0.04 | 0.04 | 0.04 | 0.04 | 0.04 |
| $SiO_2/ZrO_2$ | 133 | 67 | 45 | 67 | 45 |
| Characteristic | | | | | |
| Knoop Hardness (GPa) | 5.7 | 5.8 | 5.9 | 5.8 | 6.1 |
| Young's Modulus (GPa) | 82 | 84 | 82 | 82 | 81 |
| Compressive Stress Layer (μm) | 140 | 150 | 170 | 170 | 160 |
| Transverse Bending Strength ($kgf/mm^2$) | 87 | 91 | 92 | 90 | 95 |
| Acid Resistance (%) | 0.02 | 0.03 | 0.05 | 0.03 | 0.03 |
| Water Resisting Property (%) | 0.02 | 0.01 | 0.05 | 0.01 | 0.01 |
| Glass Transition Point (° C.) | 486 | 494 | 503 | 505 | 513 |
| Specific Gravity ($g/cm^3$) | 2.47 | 2.47 | 2.47 | 2.47 | 2.46 |
| Expansion Coefficient (/° C.) | 97 | 95 | 90 | 91 | 87 |
| Surface Roughness Ra (Å) | 4.4 | 5.1 | 6.1 | 5.5 | 6.2 |
| Projection Height (μm) | 0.96 | 1.00 | 1.04 | 1.01 | 1.05 |
| Specific Modulus ($\times 10^6$ Nm/kg) | 33.2 | 34.0 | 33.2 | 33.2 | 32.9 |
| Liquid Phase Temperature (° C.) | 870 | 895 | 880 | 880 | 880 |

TABLE 1-continued

|  | Example | | | | |
| --- | --- | --- | --- | --- | --- |
|  | 1 | 2 | 3 | 4 | 5 |
| Viscosity at Liquid Phase Temperature (poise) | 24500 | 30000 | 67000 | 54000 | 79000 |

TABLE 2

|  | Example | |
| --- | --- | --- |
|  | 6 | 7 |
| Composition | | |
| $SiO_2$ (mol %) | 67.3 | 65.0 |
| $ZrO_2$ (mol %) | 1.7 | 0.6 |
| $Al_2O_3$ (mol %) | 9.5 | 9.0 |
| $Li_2O$ (mol %) | 10.2 | 12.1 |
| $Na_2O$ (mol %) | 10.5 | 10.5 |
| $TiO_2$ (mol %) | 0.7 | 0 |
| CaO (mol %) | — | 1.5 |
| MgO (mol %) | — | 1.3 |
| $As_2O_3$ (mol %) | 0.1 | 0.1 |
| $Sb_2O_3$ (mol %) | 0.04 | 0.04 |
| $SiO_2/ZrO_2$ | 45 | 108 |
| Characteristic | | |
| Knoop Hardness (GPa) | 6.0 | 5.5 |
| Young's Modulus (GPa) | 83 | 80 |
| Compressive Stress Layer ($\mu$m) | 180 | 130 |
| Transverse Bending Strength (kgf/mm²) | 92 | 85 |
| Acid Resistance (%) | 0.03 | 0.02 |
| Water Resisting Property (%) | 0.02 | 0.01 |
| Glass Transition Point (° C.) | 516 | 475 |
| Specific Gravity (g/cm³) | 2.49 | 2.44 |
| Expansion Coefficient (/° C.) | 93 | 98 |
| Surface Roughness Ra (Å) | 6.2 | 4.4 |
| Projection Height ($\mu$m) | 1.07 | 1.00 |
| Specific Modulus (×10⁶ Nm/kg) | 33.3 | 32.8 |
| Liquid Phase Temperature (° C.) | 890 | 875 |
| Viscosity at Liquid Phase Temperature (poise) | 60000 | 23000 |

TABLE 3

|  | Example | | | | |
| --- | --- | --- | --- | --- | --- |
|  | 8 | 9 | 10 | 11 | 12 |
| Composition | | | | | |
| $SiO_2$ (mol %) | 66.8 | 67.0 | 67.5 | 67.4 | 68.0 |
| $ZrO_2$ (mol %) | 0.6 | 1.0 | 1.5 | 1.0 | 1.5 |
| $Al_2O_3$ (mol %) | 8.5 | 9.0 | 9.5 | 9.5 | 10.0 |
| $Li_2O$ (mol %) | 12.1 | 12.0 | 10.0 | 12.1 | 10.0 |
| $Na_2O$ (mol %) | 10.0 | 10.0 | 10.5 | 9.0 | 9.5 |
| $TiO_2$ (mol %) | 1.0 | 1.0 | 0.5 | 1.0 | 0.5 |
| CaO (mol %) | 1.0 | — | — | — | 0.5 |
| MgO (mol %) | — | — | 0.5 | — | — |
| $As_2O_3$ (mol %) | 0.1 | 0.1 | 0.1 | 0.1 | 0.1 |
| $Sb_2O_3$ (mol %) | 0.04 | 0.04 | 0.04 | 0.04 | 0.04 |
| $SiO_2/ZrO_2$ | 133 | 67 | 45 | 67 | 45 |
| Characteristic | | | | | |
| Knoop Hardness (GPa) | 5.7 | 5.8 | 5.9 | 5.8 | 6.1 |
| Young's Modulus (GPa) | 82 | 84 | 82 | 82 | 81 |
| Compressive Stress Layer ($\mu$m) | 140 | 150 | 170 | 170 | 160 |
| Transverse Bending Strength (kgf/mm²) | 87 | 91 | 92 | 90 | 95 |
| Acid Resistance (%) | 0.02 | 0.03 | 0.05 | 0.03 | 0.03 |
| Water Resisting Property (%) | 0.02 | 0.01 | 0.05 | 0.01 | 0.01 |
| Glass Transition Point (° C.) | 486 | 494 | 503 | 505 | 513 |
| Specific Gravity (g/cm³) | 2.47 | 2.47 | 2.47 | 2.47 | 2.46 |
| Expansion Coefficient (/° C.) | 97 | 95 | 90 | 91 | 87 |
| Surface Roughness Ra (Å) | 4.4 | 5.1 | 6.1 | 5.5 | 6.2 |
| Projection Height ($\mu$m) | 0.96 | 1.00 | 1.04 | 1.01 | 1.05 |
| Specific Modulus (×10⁶ Nm/kg) | 33.2 | 34.0 | 33.2 | 33.2 | 32.9 |
| Liquid Phase Temperature (° C.) | 870 | 895 | 880 | 880 | 880 |

TABLE 4

|  | Example | | | | Comparative Example 1 |
| --- | --- | --- | --- | --- | --- |
|  | 13 | 14 | 15 | 16 |  |
| Composition | | | | | |
| $SiO_2$ (mol %) | 65.0 | 66.0 | 67.3 | 64.0 | 66.8 |
| $ZrO_2$ (mol %) | 2.5 | 2.0 | 1.7 | 0 | 0.6 |
| $Al_2O_3$ (mol %) | 8.0 | 8.7 | 9.5 | 9.0 | 8.5 |
| $Li_2O$ (mol %) | 12.0 | 12.1 | 10.2 | 12.5 | 12.1 |
| $Na_2O$ (mol %) | 10.0 | 10.2 | 10.5 | 10.5 | 10.0 |
| $TiO_2$ (mol %) | 0.5 | 0.8 | 0.7 | 2.0 | 0 |
| CaO (mol %) | 2.0 | — | — | 1.0 | 1.0 |
| MgO (mol %) | — | — | — | 1.0 | 0 |
| $As_2O_3$ (mol %) | 0.1 | 0.1 | 0.1 | 0.1 | 0.1 |
| $Sb_2O_3$ (mol %) | 0.04 | 0.04 | 0.04 | 0.04 | 0.04 |
| $SiO_2/ZrO_2$ | 26 | 33 | 45 | ∞ | 133 |
| Characteristic | | | | | |
| Knoop Hardness (GPa) | 6.3 | 6.2 | 6.0 | 5.5 | 5.6 |
| Young's Modulus (GPa) | 85 | 83 | 83 | 81 | 78 |
| Compressive Stress Layer ($\mu$m) | 210 | 190 | 180 | 130 | 130 |
| Transverse Bending Strength (kgf/mm²) | 103 | 87 | 92 | 85 | 85 |
| Acid Resistance (%) | 0.04 | 0.03 | 0.03 | 0.02 | 0.02 |
| Water Resisting Property (%) | 0.02 | 0.01 | 0.02 | 0.01 | 0.02 |
| Glass Transition Point (° C.) | 513 | 501 | 516 | 475 | 490 |
| Specific Gravity (g/cm³) | 2.53 | 2.51 | 2.49 | 2.44 | 2.47 |
| Expansion Coefficient (/° C.) | 90 | 93 | 93 | 98 | 98 |
| Surface Roughness Ra (Å) | 7.0 | 7.0 | 6.2 | 4.5 | 4.8 |
| Projection Height ($\mu$m) | 1.18 | 1.15 | 1.07 | 0.96 | 0.99 |

TABLE 4-continued

|  | Example | | | | Comparative Example 1 |
|---|---|---|---|---|---|
|  | 13 | 14 | 15 | 16 | |
| Specific Modulus (×10⁶Nm/kg) | 33.6 | 33.1 | 33.3 | 33.2 | 31.6 |
| Liquid Phase Temperature (° C.) | 900 | 900 | 890 | 900 | 890 |

TABLE 5

|  | Example | | | | |
|---|---|---|---|---|---|
|  | 17 | 18 | 19 | 20 | 21 |
| Composition | | | | | |
| $SiO_2$ (mol %) | 66.8 | 67.0 | 67.5 | 67.4 | 68.0 |
| $ZrO_2$ (mol %) | 0.6 | 1.0 | 1.5 | 1.0 | 1.5 |
| $Al_2O_3$ (mol %) | 8.5 | 9.0 | 9.5 | 9.5 | 10.0 |
| $Li_2O$ (mol %) | 12.1 | 12.0 | 10.0 | 12.1 | 10.0 |
| $Na_2O$ (mol %) | 10.0 | 10.0 | 10.5 | 9.0 | 9.5 |
| $TiO_2$ (mol %) | 1.0 | 1.0 | 0.5 | 1.0 | 0.5 |
| CaO (mol %) | 1.0 | — | — | — | 0.5 |
| MgO (mol %) | — | — | 0.5 | — | — |
| $As_2O_3$ (mol %) | 0.1 | 0.1 | 0.1 | 0.1 | 0.1 |
| $Sb_2O_3$ (mol %) | 0.04 | 0.04 | 0.04 | 0.04 | 0.04 |
| $SiO_2/ZrO_2$ | 133 | 67 | 45 | 67 | 45 |
| Characteristic | | | | | |
| Knoop Hardness (GPa) | 5.7 | 5.8 | 5.9 | 5.8 | 6.1 |
| Young's Modulus (GPa) | 82 | 84 | 82 | 82 | 81 |
| Compressive Stress Layer (μm) | 140 | 150 | 170 | 170 | 160 |
| Transverse Bending Strength (kgf/mm²) | 87 | 91 | 92 | 90 | 95 |
| Acid Resistance (%) | 0.02 | 0.03 | 0.05 | 0.03 | 0.03 |
| Water Resisting Property (%) | 0.02 | 0.01 | 0.05 | 0.01 | 0.01 |
| Glass Transition Point (° C.) | 486 | 494 | 503 | 505 | 513 |
| Specific Gravity (g/cm³) | 2.47 | 2.47 | 2.47 | 2.47 | 2.46 |
| Expansion Coefficient (/° C.) | 97 | 95 | 90 | 91 | 87 |
| Surface Roughness Ra (Å) | 4.4 | 5.1 | 6.1 | 5.5 | 6.2 |
| Projection Height (μm) | 0.96 | 1.00 | 1.04 | 1.01 | 1.05 |
| Specific Modulus (×10⁶ Nm/kg) | 33 | 34 | 33 | 33 | 33 |
| Liquid Phase Temperature (° C.) | 870 | 895 | 880 | 880 | 880 |

TABLE 6

|  | Example | | | |
|---|---|---|---|---|
|  | 22 | 23 | 24 | 25 |
| Composition | | | | |
| $SiO_2$ (mol %) | 65.0 | 65.0 | 66.0 | 67.3 |
| $ZrO_2$ (mol %) | 0 | 2.5 | 2.0 | 1.7 |
| $Al_2O_3$ (mol %) | 9.0 | 8.0 | 8.7 | 9.5 |
| $Li_2O$ (mol %) | 12.5 | 12.0 | 12.1 | 10.2 |
| $Na_2O$ (mol %) | 10.5 | 10.0 | 10.2 | 10.5 |
| $TiO_2$ (mol %) | — | 0.5 | 0.8 | 0.7 |
| CaO (mol %) | 1.5 | 2.0 | — | — |
| MgO (mol %) | 1.5 | — | — | — |
| $As_2O_3$ (mol %) | 0.1 | 0.1 | 0.1 | 0.1 |
| $Sb_2O_3$ (mol %) | 0.04 | 0.04 | 0.04 | 0.04 |
| $SiO_2/ZrO_2$ | ∞ | 26 | 33 | 45 |
| Characteristic | | | | |
| Knoop Hardness (GPa) | 5.5 | 6.3 | 6.2 | 6.0 |
| Young's Nodulus (GPa) | 80 | 85 | 83 | 83 |
| Compressive Stress Layer (μm) | 130 | 210 | 190 | 180 |
| Transverse Bending Strength (kgf/mm²) | 85 | 103 | 87 | 92 |
| Acid Resistance (%) | 0.02 | 0.04 | 0.03 | 0.03 |
| Water Resisting Property (%) | 0.01 | 0.02 | 0.01 | 0.02 |
| Glass Transition Point (° C.) | 475 | 513 | 501 | 516 |
| Specific Gravity (g/cm³) | 2.44 | 2.53 | 2.51 | 2.49 |
| Expansion Coefficient (/° C.) | 98 | 90 | 93 | 93 |
| Surface Roughness Ra (Å) | 4.4 | 7.0 | 7.0 | 6.2 |
| Projection Height (μm) | 0.96 | 1.13 | 1.10 | 1.07 |
| Specific Modulus (×10⁶ Nm/kg) | 33 | 34 | 33 | 33 |
| Liquid Phase Temperature (° C.) | 900 | 895 | 890 | 890 |

Subsequently, the both principal surfaces of the glass substrate were ground by a diamond grindstone having grains smaller than those of the above grindstone. In this case, a load was set to the extent of 100 Kg. Thereby, the both principle surfaces of the glass substrate were ground into a surface roughness Rmax (JIS B 0601) of about 10 μm.

Next, an opening was formed at a center portion of the glass substrate by the use of a cylindrical grindstone. Further, an outer side end surface was ground to a diameter of 66 mm. Thereafter, outer and inner side end surfaces were chamfered.

(2) Lapping step

The lapping step was performed for the glass substrate to improve dimension and shape accuracy. The lapping step is carried out by the use of a lapping apparatus. In this case, the lapping step is conducted two times by changing grain degree from #400 to #1000. Specifically, the lapping was performed for the both principle surfaces of the glass substrate so that the principle surfaces had a surface accuracy of 0–1 $\mu$m and the surface roughness Rmax of about 6 $\mu$m. In this event, the lapping was carried out by rotating an inner gear and an outer gear by the use of alumina grains having a grain degree of #400 on the condition that the load was kept at about 100 Kg. Next, the lapping is performed by changing the grain degree of the alumina grain into #1000. As a result, the surface roughness Rmax becomes about 2 $\mu$m. Subsequently, the glass substrate was immersed in washing units by using natural detergent and water to be washed.

(3) First polishing step

Next, first polishing was performed by a polishing apparatus to remove a defect and a distortion remaining in the above lapping process. Specifically, a hard polisher (which may be a cerium impregnated foamed urethane pad, such as MHC15 made by Speedfam) was used as a polisher and the first polishing was performed under the following polishing condition.

Polishing liquid: oxide cerium+water

Load: 300 Kg/cm$^2$ (L=238 Kg)

Polishing time: 15 minutes

Removing amount: 30 $\mu$m

Revolution of lower surface plate: 40 rpm

Revolution of upper surface plate: 35 rpm

Revolution of inner gear: 14 rpm

Revolution of outer gear: 29 rpm

The glass substrate was washed by being successively dipped in washing units of natural detergent, pure water, IPA (isopropyl alchohol), IPA (vapor drying) after the first polishing.

(4) Second polishing step

Next, second polishing was conducted by changing the above hard polisher into a soft polisher (which may be a polishing pad of a suede type, such as Polylax made by Speedfam) by using the polishing apparatus used in the first polishing process. The polishing condition is similar to the first polishing step except for the load of 100 g/cm$^2$, the polishing time of 5 minutes and the removing amount of 5 $\mu$m. The glass substrate was immersed in washing units of the natural detergent, the pure water, the IPA (isopropyl alcohol), the IPA (vapor drying) to be washed therein after the second polishing step. In this case, a supersonic wave was applied to each of the washing units.

After the above grinding and polishing step, the glass substrate of the disc form having an outer diameter of 66 mm$\phi$, a hole diameter 20 mm$\phi$ of the center portion and the thickness of 0.5 mm was obtained. The obtained glass substrate was immersed in a processing solution of mixed salt containing KNO$_3$ of 60 weight % and NaNO$_3$ of 40 weight % which are kept at 400° C. to chemically reinforce by the ion exchange method.

The measuring result of Knoop hardness, Young's modulus, specific modulus, the thickness of the compressive stress layer, transverse bending strength, acid resistance, water resisting property, the glass transition point, specific gravity, expansion coefficient, the height of the projection, the surface roughness (Ra), the liquid temperature, the viscosity at the liquid temperature are represented as examples 1 to 5 in Table 1, examples 6 to 7 in Table 2, examples 8 to 12 in Table 3, examples 13 to 16 in Table 4, examples 17 to 21 in Table 5 and examples 22 to 25 in Table 6.

As seen from Tables 1 to 6, the values of the Knoop hardness and the Young's modulus are large (the Young's modulus of 80 GPa or more, the Knoop hardness of 5.5 GPa or more) and the strength is high in the glass substrates of the examples 1 to 25. In particular, it is confirmed that the glass substrate of examples 8 to 16 in Tables 3 and 4 has a high specific modulus so that the burring does not easily occur even when the disk is rotated at a high speed. Further, it is found out that the glass substrate of examples 17 to 21 and examples 23 to 25 is excellent in characteristic because they have ZrO$_2$. In this case, a comparative example 1 (Table 4) was made by removing TiO$_2$ from the composition of the example 8. It is found out from Tables 3 and 4 that the comparative example is inferior to the example 8 in Young' modulus and specific modulus.

Further, the glass substrates of the examples 1 to 25 are excellent in water resisting property (pH 6.5–7.5, the weight loss rate is 0.1 wt % or less when the glass substrate is immersed in pure water of about 100° C. for 60 minutes) and in acid resistance (the weight loss rate is 0.1 wt % or less when the glass substrate is immersed in nitrate solution of about 100° C. for 60 minutes at the concentration of 0.01N).

In addition, the compressive stress layer having the thickness of 130 $\mu$m or more can be formed by the use of the chemical reinforcement due to the ion exchange method. The transverse bending strength due to the compressive stress layer is high (85 kgf/mm$^2$) and has an excellent resistance to destruction.

Thus, the glass substrate (examples 1 to 25) for the information recording medium of this invention has a high strength. Further, it is difficult that the warping and burring occur on the substrate even when the glass substrate of the disk form is rotated at the high speed. Consequently, the substrate can be formed enough thinly.

The height of the projection consisting of undissolved substance of ZrO$_2$ on the substrate surface is 1.07 $\mu$m or less in the glass substrate of this invention. Thus, the glass substrate is excellent in the flatness. Consequently, the spacing loss between the magnetic head and the magnetic recording medium can be reduced to achieve the high recording density. As a result, the glass substrate according to this invention can be preferably used as the glass substrate for the magnetic recording medium.

Further, the liquid phase temperature is low (895° C. or less) and the viscosity at the liquid phase temperature is high (23000 poises or more) in the glass substrate according to this invention. Consequently, the glass substrate can be formed by the molding method such as the downdraw molding or the press molding without the devitrification of the glass.

In this case, the liquid phase temperature is determined as follows. Namely, glass grains having the diameter of 1.5 to 2 mm are kept in a devitrification testing furnace having a temperature slope between 600 and 1100° C. for two hours. Thereafter, presence or absence of a crystal is observed by a microscope having magnification of 100. The liquid phase temperature is determined as the border between the temperature at which the crystal exists and the temperature at which no crystal exists.

In this case, the Knoop hardness was measured on the basis of JOGIS-09. Further, the depth of the compressive stress layer and the transverse bending strength was measured by cutting a thin section of 0.4 mm from the glass substrate obtained in the above example and by using a polarizing microscope. The water resisting property and the acid resistance were measured on the basis of JOGIS-06.

The fabrication of the magnetic recording medium

EXAMPLE 26

The irregularity control layer, the underlying layer, the magnetic layer, the protection layer and the lubricant layer are successively deposited on the glass substrate which are obtained in the examples 1 to 25.

Specifically, the glass substrate is set on a substrate holder and thereafter, is sent to a preparation chamber in the in-line sputtering apparatus. Successively, the holder which is set with the glass substrate is sent to a first chamber in which an Al target is arranged to sputter in an atmosphere of $Ar+N_2$ gas ($N_2$=4%) at the pressure of 4 mTorr at the substrate temperature of 350° C. As a result, an AlN thin-film (irregularity control film) having the surface roughness Rmax of 15 angstroms and the film thickness of 50 angstroms was formed on the glass substrate.

Subsequently, the holder with the glass substrate was sequentially sent to a second chamber in which CrV (Cr: 83 at %, V: 17 at %) is arranged and a third chamber in which CoPtCr (Co: 76 at %, Pt: 11 at %, Cr: 13 at %) target is arranged to deposit films on the substrate. These films were sputtered in an Ar atmosphere at the pressure of 2 mTorr at the substrate temperature of 350° C. to deposit a CrV underlying layer having the film thickness of about 600 angstroms and a CoPtCt magnetic layer having the film thickness of about 300 angstroms.

Next, the laminate having the irregularity control layer, the underlying layer and the magnetic layer was sent to a fourth chamber for a heat treatment. In this event, the fourth chamber has an Ar gas atmosphere (the pressure of 2 mTorr) to carry out the heat treatment of 450° C.

The above substrate was sent to a fifth chamber in which a carbon target is arranged. In this event, a carbon protection film having the film thickness of about 100 angstroms was formed in the same condition with the above CrV underlying layer and CoPtCr magnetic layer except for the deposition in the atmosphere of $Ar+H_2$ gas ($H_2$=6%).

Finally, the substrate having the carbon protection later was taken out from the above in-line sputtering apparatus. Thereafter, perfluoropolyether was applied on the surface of the carbon protection layer by the dipping method to form the lubricant layer having the film thickness of 8 angstroms. Thus, the magnetic recording medium was obtained.

Evaluation

The above magnetic recording medium was set on a disk rotating apparatus to rotate at 35000 rpm. As a results it was confirmed that the magnetic recording medium was not destroyed.

Further, the coercive force of the magnetic recording medium was 2000 Oe. Thus, the magnetic recording medium having a high recording density was obtained. Further, with respect to the head, coefficient of dynamic friction was 0.2 while coefficient of static friction was 0.25. Moreover, CCS (contact start/stop) durability test (one hundred thousand times) was carried out. As a result of the test, the magnetic recording medium had no problems. Further, the magnetic recording medium having a high recording density and a high reliability was obtained because the glide height was less than 0.015 µm.

In addition, the glide test was carried out for the obtained magnetic disk. As a result of the test, a hit (the hit means that the head contacts with the projections on the surface of the magnetic disk) or a crash (the crash means that the head collides with the projections on the surface of the magnetic disk) was not confirmed.

Although this invention is described with the above preferred embodiments, this invention is not restricted to the above embodiments. For example, the composition of the glass or the material of the magnetic layer is not restricted to that in the embodiments.

What is claimed is:

1. A magnetic recording medium having a glass substrate, wherein:

the glass substrate contains undissolved concentrations of $ZrO_2$, the glass substrate has a highly polished surface, the undissolved concentrations of $ZrO_2$ are left on the polished surface as projections when the glass substrate is polished, and a content of $ZrO_2$ is selected within the range of 2.8 mol % or less in order to ensure that a height of each of the projections is within a predetermined range in order to allow the polished substrate to be suitable for use for a magnetic recording medium.

2. A magnetic recording medium as claimed 1, wherein:

the content of $ZrO_2$ falls within the range between 0.6 and 1.9 mol %.

3. A magnetic recording medium having a glass substrate, wherein:

the glass substrate contains undissolved concentrations of $ZrO_2$, the glass substrate further contains $Li_2O$, the glass substrate has a highly polished surface, the undissolved concentrations of $ZrO_2$ are left on the polished surface as projections when the glass substrate is polished, a content of $ZrO_2$ is selected within the range of 2.8 mol % or less in order to reduce a height of each of the projections so that the polished substrate is suitable for use for a magnetic recording medium, and $Li_2O$ has a viscosity of 20000 poise or more at a liquid phase temperature of the glass.

4. A magnetic recording medium as claimed 3, wherein:

the content of $ZrO_2$ falls within the range between 0.6 and 1.9 mol %.

5. A magnetic recording medium having a glass substrate, wherein:

the glass substrate contains undissolved concentrations of $ZrO_2$, the glass substrate further contains $TiO_2$ and $B_2O_3$, the glass substrate has a highly polished surface, the undissolved concentrations of $ZrO_2$ are left on the polished surface as projections when the glass substrate is polished, a content of $ZrO_2$ is selected within the range of 2.8 mol % or less in order to ensure a height of each of the projections to be within a predetermined range in order to allow the polished substrate to be suitable for use for a magnetic recording medium, a content of $TiO_2$ falls within the range between 0.2 and 3.0 mol %, a content of $B_2O_3$ is 0.9 mol % or less, the glass is composed of a chemically reinforced glass, the chemically reinforced glass has a compressive stress layer having a thickness exceeding 100 μm when the glass is immersed in a chemical reinforcing process solution of a mixed salt containing 60 weight % of $KNO_3$ and 40 weight % of $NaNO_3$ which is kept at 400° C. for 4 hours.

6. A magnetic recording medium claimed in claim 5, wherein:

the glass substrate further contains $SiO_2$, $Al_2O_3$ and $Na_2O$, $SiO_2$ has a content which falls within the range between 57 and 74 mol %, $Al_2O_3$ has a content which falls within the range between 3 and 15 mol %, $Na_2O$ has a content which falls within the range between 4 and 14 mol %.

7. A magnetic recording medium claimed in claim 6, wherein:

$SiO_2/ZrO_2$ has a mol ratio between 35 and 130.

8. A magnetic recording medium having a glass substrate, wherein:

the glass substrate contains undissolved concentrations of $ZrO_2$, the glass substrate further contains $TiO_2$ and $B_2O_3$, the glass substrate has a highly polished surface, the undissolved concentrations of $ZrO_2$ are left on the polished surface as projections when the glass substrate is polished, a content of $ZrO_2$ is selected within the range of 2.8 mol % or less in order to ensure that a height of each of the projections is within a predetermined range in order to allow the polished substrate to be suitable for use for a magnetic recording medium, a content of $TiO_2$ falls within the range between 0.2 and 3.0 mol %, a content of $B_2O_3$ is 0.9 mol % or less, the glass substrate has a specific modulus of $32.0 \times 10^6$ Nm/Kg or more.

9. A magnetic recording medium claimed in claim 8, wherein:

the glass substrate further contains $SiO_2$, $Al_2O_3$ and $Na_2O$, $SiO_2$ has a content which falls within the range between 57 and 74 mol %, $Al_2O_3$ has a content which falls within the range between 3 and 15 mol %, $Na_2O$ has a content which falls within the range between 4 and 14 mol %.

10. A magnetic recording medium claimed in claim 9, wherein:

$SiO_2/ZrO_2$ has a mol ratio between 35 and 130.

11. A magnetic recording medium having a glass substrate, wherein:

the glass substrate contains undissolved concentrations of $ZrO_2$, the glass substrate has a polished surface which is precisely polished, the undissolved concentrations of $ZrO_2$ are left on the polished surface as projections when the glass substrate is precisely polished, and a content of $ZrO_2$ is selected within such a range that a height of each of the projections is within a predetermined range in order to allow the polished substrate to be suitable for use for a magnetic recording medium.

12. A magnetic recording medium having a glass substrate, wherein:

the glass substrate contains undissolved concentrations of raw material components of the glass substrate, the glass substrate has a highly polished surface, the undissolved concentrations of raw material components are left on the polished surface as projections when the glass substrate is precisely polished, and a content of the raw material component is selected within such a range that a height of each of the projections is within a range that makes the substrate suitable for use for a magnetic recording medium.

* * * * *